United States Patent [19]

Pahr et al.

[11] Patent Number: 5,394,278
[45] Date of Patent: Feb. 28, 1995

[54] METHOD AND APPARATUS FOR ERASING INFORMATION FROM A MAGNETIC TAPE

[75] Inventors: Per O. Pahr, Lier; Ladislav Rubas, Tranby, both of Norway

[73] Assignee: Tandberg Data A/S, Oslo, Norway

[21] Appl. No.: 23,590

[22] Filed: Feb. 26, 1993

[30] Foreign Application Priority Data

Feb. 26, 1992 [EP] European Pat. Off. ........ 92103289.2

[51] Int. Cl.6 .......................... G11B 5/09; G11B 5/03
[52] U.S. Cl. ........................................ 360/66; 360/48
[58] Field of Search ............... 360/57, 66, 72.1, 72.2, 360/74.1, 118, 48, 55, 27

[56] References Cited

U.S. PATENT DOCUMENTS

| | | | |
|---|---|---|---|
| 3,862,355 | 1/1975 | Guisinger | 178/6.6 P |
| 4,121,264 | 10/1978 | Kishi et al. | 360/55 |
| 4,455,582 | 6/1984 | Yanagida et al. | 360/668 |
| 4,740,847 | 4/1988 | Watanabe et al. | 360/66 |
| 4,771,346 | 9/1988 | Shoji et al. | 360/66 X |
| 4,819,103 | 4/1989 | Okamura | 360/66 X |
| 4,851,933 | 7/1989 | Sugaya et al. | 360/66 X |
| 5,008,765 | 4/1991 | Youngquist | 360/77.12 |
| 5,043,831 | 8/1991 | Muramoto et al. | 360/66 |
| 5,079,649 | 1/1992 | Pahr | 360/66 |
| 5,132,853 | 7/1992 | Kulakowski et al. | 360/66 |
| 5,142,423 | 8/1992 | Yamagata | 360/66 |
| 5,268,802 | 12/1993 | Bar | 360/77.13 |
| 5,293,278 | 3/1994 | Pahr | 360/67 |

*Primary Examiner*—Donald Hajec
*Assistant Examiner*—Le, Thien Minh
*Attorney, Agent, or Firm*—Hill, Steadman & Simpson

[57] ABSTRACT

Information may be erased from a magnetic tape with the tape being divided into at least two physical partitions. Each physical partition includes a plurality of data tracks carrying recorded data or the like and at least one set of servo tracks carrying position information dedicated to an area between the data tracks. At least one of the physical partitions may be erased during movement of the tape in a forward direction defined by moving the tape towards an end of tape designation, and at least a second of the physical partitions may be erased during the movement of the tape either in a backward direction defined by moving the tape towards the beginning of the tape or in the forward direction from the beginning of tape to the end of the tape.

5 Claims, 1 Drawing Sheet

METHOD AND APPARATUS FOR ERASING INFORMATION FROM A MAGNETIC TAPE

BACKGROUND OF THE INVENTION

The present invention relates to a method for erasing information from a magnetic tape. The tape is divided into at least two physical partitions wherein each physical partition includes a plurality of data tracks carrying recorded data or the like and at least one set of servo tracks carrying position information and dedicated to an area between the data tracks. An apparatus for erasing such information is also disclosed.

More specifically, the invention is applicable to tape drives compatible with QIC standard tape formats, i.e. drives using a ¼-inch (6.27 mm) magnetic tape width. Quarter-inch cartridge (QIC) drive standards relate to the 10 GByte, 5¼ inch form factor tape drive and the 3 GByte, 3½ inch form factor tape drive.

The specifications for the 10 GByte standard and for the 3 GByte standard are collected in various documents, for example in QIC-91-41 (QIC-1CF), Oct. 8, 1991, Revision B: "Common Recording Format Specification" and QIC-9142 (QIC-10GB), Oct. 10, 1991, Revision B: "Serial Recorded Magnetic Tape Cartridge for Information Interchange", both for the 10 GByte standard, and QIC-3000, Revision A, Sep. 24, 1991: "Proposed Interchange Standard Serial Recorded Magnetic Tape Cartridge for Information Interchange" for the 3 GByte standard.

As shown in these documents, the tape formats use dedicated servo tracks pre-recorded on the tape by a tape manufacturer. The principle of dedicated servo tracks is disclosed in U.S. Pat. No. 5,008,765. The servo track carries position information for moving a multiple channel head to one of a plurality of predetermined position once the head has been moved proximate to that predetermined position. The use of such servo tracks has effectively avoided read/write errors.

When tape cartridges are worn out and are to be discarded, or if they are to be re-used, the information stored thereon usually must be erased. In particular, if worn out tapes are to be recycled, the information must be deleted with a cheap and efficient method using, preferably, an erase head. Current ¼-inch tape drive formats in use implement the erase function with a full-width erase head. In this way, the servo tracks are destroyed during the erasing procedure. This is acceptable if the tapes or tape cartridges, respectively, are to be discarded; however, the procedure makes the tapes worthless if it should be re-used for other purposes. This situation often arises when a large number of cartridges has been stored for archival purposes and may thereafter be re-used for other purposes, for example in other offices or departments.

Therefore, a need arises for a method for erasing information from a magnetic tape without destroying position information on the servo track. Relying on over-writing only, as the QIC specifications state, may cause troubles not only if the tapes contain confidential data or proprietary information which must be kept within the company, but also for future applications if the linear recording density may be considerably increased, for example, to 35 GByte. A proposal for such an erasing function is not disclosed by U.S. Pat. No. 5,008,765.

The 10 GByte or 3 GByte drives must also both write and read formerly used tape formats so that efficient data interchange may take place between various models of the QIC drives with the same form factor. Therefore, to ensure full backward functionality of the tape drives, the erase function must be used for these tape formats. Furthermore, the customers are accustomed to this function since an "erase tape command" is available using tape drive software run on most host computers.

It is, therefore, desirable that the same erase function be implemented on the 3 or 10 GByte products. Also, a forward compatibility may be best ensured if the conventional erase function is used for the 10 GByte tapes. This is, in particular, the case if doubling of the cartridge capacity is performed by doubling of the number of tracks (possibly with increased linear density) by using the same tapes having substantially the same magnetic media formulation and using, if possible, the same number of servo tracks as before.

U.S. Pat. No. 4,121,264 discloses a method for recording information signals and control signals in parallel tracks on a magnetic recording medium. The tape has recorded thereon a first main track containing an information signal. The track is recorded in what may be called the forward direction. The tape also includes another main track substantially identical with the first one, but recorded with the tape moving in a reverse direction. A much narrower secondary control track is arranged alongside the first of the main tracks and recorded simultaneously therewith. The distance between the first main track and the associated second control track is selected such that a second secondary control track may be provided therebetween which is associated with the second main information track and is again simultaneously recorded therewith. A special embodiment shows each main track being sub-divided into subtracks having a guard band between them. An erase head is provided capable of erasing both the main information tracks and the corresponding control subtrack by defining an air gap having an overall length equal to the sum of the widths of the control subtrack recorded in the opposite direction and its two guard bands. The erase head is further designed to erase simultaneously the secondary control track that corresponds to both of the subtracks. The respective pole pieces are spaced from one another such that the secondary control track lying between the subtracks and the first secondary control track is not covered by the erasing field of the erase head.

SUMMARY OF THE INVENTION

It is, therefore, an object of the present invention to provide a system for erasing information from a magnetic tape. More specifically, it is an object of the present invention to erase information from a magnetic tape which may be used with the QIC standard tape drive formats.

Accordingly, at least one physical partition of the tape is erased during movement of the tape in a forward direction defined by moving the tape towards the "end of tape", and at least a second physical partition is erased during movement of the tape either in a backward direction defined by moving the tape towards the "beginning of tape" or in a forward direction from the "beginning of tape" to the "end of tape".

The total lapse of time will be the same as with conventional erasing methods since the tape must always be rewound to the "beginning of tape" after one conventional erase command. The method is further applicable when recording takes place on an already used tape cartridge. The recording starts on a first track set at "beginning of tape" having the erase option "on", and the lower part of the tape is filled with data. When recording starts on the first track set on the upper part of the tape, the erased option is turned "on", and the erase procedure will be performed during movement from the "beginning of tape" to the "end of tape". Therefore, the method complies with the requirements of at least the QIC-150 and QIC-525 standards.

Preferably, at least the servo tracks are excluded from being erased. As a result, the positioning information is kept on the tape and may be re-used after previously recorded information is deleted from the tape. Furthermore, preferably at least one of the data tracks immediately adjacent to the servo tracks is excluded from being fully erased. This alleviates the problem associated with having no guard bands between the physical data track and the servo track.

It is a further object of the present invention to provide an apparatus for moving the tape relative to an erase head in a forward direction and in a backward direction. An erase gap width of the erase head is, at most, the width of the physical partitions. The erase gap width is preferably selected such that at least one of the data tracks immediately adjacent to the servo tracks is excluded from being fully erased.

Additional features and advantages of the present invention are described, and will be apparent from, the detailed description of the presently preferred embodiments and from the drawings.

DETAILED DESCRIPTION OF THE PRESENTLY PREFERRED EMBODIMENTS

Figure 1:
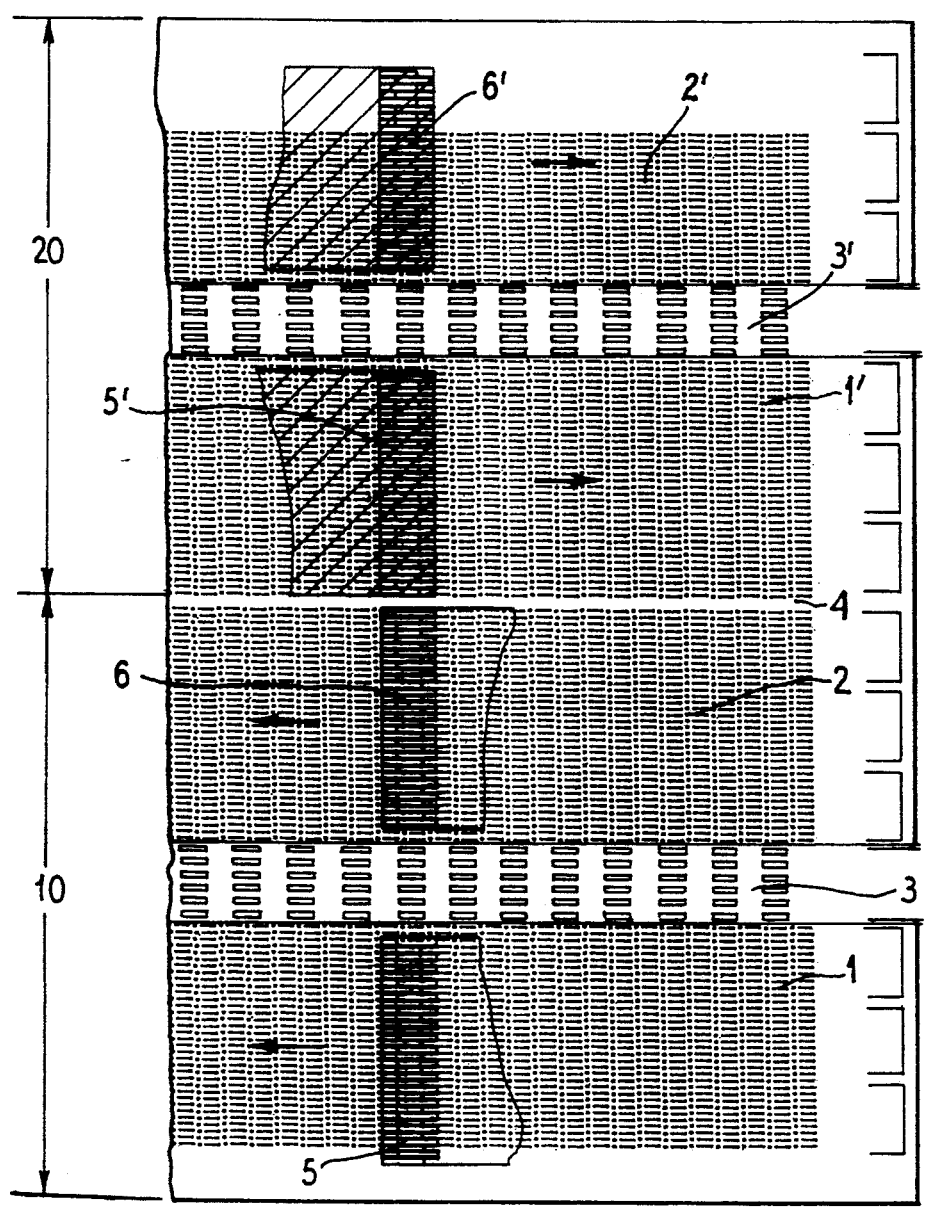
FIG. 1 illustrates a portion of a magnetic tape showing the location of physical partitions having data tracks to be erased and further including servo tracks.

As illustrated in FIG. 1, a first physical partition 10 consists of a first section 1 of 36 physical data tracks (000 to 035) and a second section 2 of 36 physical data tracks (048 to 083). Twelve servo tracks (S00 to S11) are provided in a mid-section 3 between the two sections 1 and 2. No guard bands are provided between the first section 1 and the mid-section 3 nor the second section 2 and the mid-section 3, respectively.

A similar arrangement of a second physical partition 20 with sections 1' and 2' separated by a mid-section 3' also includes twelve servo tracks provided in parallel to the above described first physical partition 10 and is separated therefrom by a center guard band 4.

With a tape designed in the above described manner, the erasing function may be performed by the system shown in FIG. 2 in the following manner:

An erase head 12 is designed such that the first physical partition 10 is erased when the tape 18 is moving in a forward direction or reverse direction and then the second physical partition 20 is erased when the tape 18 is moving in a backward direction or forward direction. However, during normal writing, the erasure of the partition 20 may take place in the forward direction. Forward and backward direction of the tape 18 is indicated by arrow "x" in FIG. 2.

Of course, the reverse action with respect to the partitions may occur such that the partition 20 may be erased during the forward movement, and the physical partition 10 may be erased during the backward movement.

Figure 2:
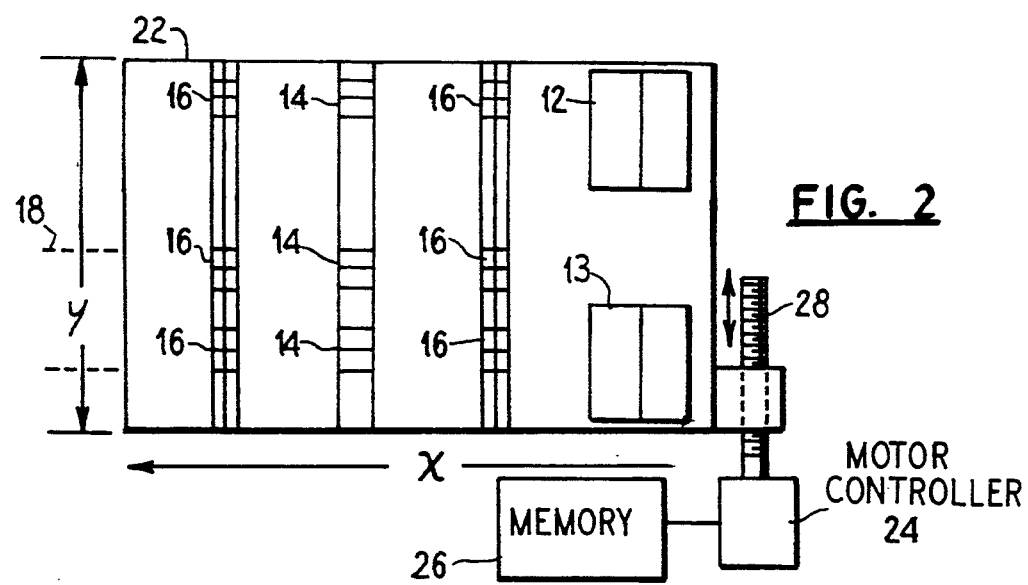
FIG. 2 illustrates an apparatus for controlling movement of the magnetic tape with respect to a recording head and erase head.

A magnetic recording head 22 is shown in FIG. 2. The tape 18 runs in close proximity to the recording head 22. The recording head 22 includes a pair of write and read gaps 14, 16 and the erase head 12. Movement of the tape 18 is controlled by a motor controller 18 and positioned information may be stored in a memory 26.

If physical tracks 000 to 035 require erasing simultaneously with the physical tracks 048 to 083, the servo tracks S00 and S11 will be damaged due to both unavoidable tolerance build-ups and magnetic fringe fields from the erase head 12. Therefore, skipping of the data tracks may be appropriate close to the servo tracks such that the erase head 12 may sweep over and erase the remaining active data tracks while the servo tracks are not influenced by mechanical tolerances or magnetic fringe field tolerances. The erase head 12 may, therefore, be designed in such a manner that its non-erasing mid-sections nominally extend from the center of physical track 034 to the center of physical track 049. Then, the physical tracks 033 and 050 will be erased such that information may be recorded and stored on these tracks and the respective outer physical tracks.

When aligning the erase head 12 with the read/write heads 14, 16, a $\pm \frac{1}{2}$ track pitch is used for mechanical tolerances, and a $\pm 1$ track pitch is used for magnetic fringe field tolerances. As a result of this arrangement, data tracks or potential data tracks may always be close to the servo tracks. The data tracks closer to the servo tracks should not be recorded when using the erase head 12, but may be actually available for use if the erase function for some reason is not used.

Skipping of data tracks will reduce the number of the remaining active data tracks and, therefore, the capacity of the magnetic tape. If four tracks are skipped in the tape as shown in FIG. 1, a capacity will be reduced from 10 GBytes to 9.7 GBbytes, nominally, and to 9.5 GBytes, nominally, if eight tracks are removed.

The latter example demonstrates the effect of erasing sections 5, 6 and 5', 6', respectively. When the above-mentioned tolerances are taken into account using an erase head sweeping over the erase sections 5, 6 and 5', 6' as illustrated in FIG. 1, no influences in the servo track sections 3, 3' result. To maintain the desired capacity, the number of tracks on the tape may be increased.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for erasing information from a magnetic tape with an erase head divided into a plurality of physical partitions, said tape being divided into at least two physical partitions wherein each of the at least two physical partitions include a plurality of data tracks carrying recorded data and at least one set of servo tracks carrying position information and dedicated to an area between the plurality of data tracks and further wherein the physical partitions of the erase head match the data tracks of the tape, the method comprising the steps of:

erasing at least a first one of said physical partitions during movement of said tape in a forward or backward direction; and erasing at least a second one of said physical partitions during movement of said tape either in a backward direction or in the forward direction wherein at least two of the plurality of data tracks are simultaneously erased.

2. The method of claim 1 further comprising the step of:

excluding at least the servo tracks from being erased.

3. The method of claim 2 further comprising the step of:

excluding at least one of the data tracks immediately adjacent to said servo tracks from being fully erased.

4. An apparatus for erasing information from a magnetic tape, said tape being divided into at least two physical partitions wherein each physical partition includes a plurality of data tracks carrying recorded data and at least one set of servo tracks carrying position information and dedicated to an area between the data tracks, said apparatus comprising:

an erase head divided into at least two corresponding physical partitions matching the at least two physical partitions of the tape; and means for moving the tape relative to the head in a forward direction and in a backward direction wherein an erase gap width of said erase head is at most the width of one of said physical partitions so as to match the data tracks of the tape and to simultaneously erase at least two of the plurality of data tracks.

5. The apparatus of claim 4 wherein said erase gap width is selected such that at least one of said data tracks immediately adjacent to said servo tracks is excluded from being fully erased.

* * * * *